Jan. 22, 1963   C. L. CASEY ETAL   3,074,607
STAMP VENDING MACHINE
Filed Dec. 8, 1958   10 Sheets-Sheet 1

FIG. 1

INVENTORS:
CHARLES L. CASEY
JUDDSON B. RYNO
BY
Mazyell, Johnston, Cook & Root
ATT'YS Jan. 22, 1963 C. L. CASEY ETAL 3,074,607
STAMP VENDING MACHINE
Filed Dec. 8, 1958 10 Sheets-Sheet 4

INVENTORS:
CHARLES L. CASEY
JUDDSON B. RYNO
BY
Mazzall, Johnston, Cook + Root
ATT'YS Jan. 22, 1963  C. L. CASEY ETAL  3,074,607
STAMP VENDING MACHINE
Filed Dec. 8, 1958  10 Sheets-Sheet 6

INVENTORS:
CHARLES L. CASEY
JUDDSON B. RYNO
BY
Marzall, Johnston, Cook & Root
ATT'YS Jan. 22, 1963  C. L. CASEY ETAL  3,074,607
STAMP VENDING MACHINE Filed Dec. 8, 1958  10 Sheets-Sheet 9

INVENTORS:
CHARLES L. CASEY
JUDDSON B. RYNO
BY
ATT'YS

3,074,607
STAMP VENDING MACHINE

Charles L. Casey, Riverside, and Juddson B. Ryno, Chicago, Ill., assignors to Reliable Engineering Co., Chicago, Ill., a corporation of Illinois
Filed Dec. 8, 1958, Ser. No. 778,985
5 Claims. (Cl. 226—62)

This invention relates to a stamp vending machine, and more particularly to a coin operated stamp vending machine operable to dispense a predetermined number of stamps in response to tender of a coin or coins.

Heretofore, many types of stamp vending machines have been developed such as the type that dispenses stamps between folded cardboard covers. This type of machine is generally objectionable since it necessitates the preparation of a certain number of stamps and insertion into the cardboard covers by the person servicing the machine.

More preferably, machines heretofore developed for dispensing stamps from a roll of stamps are desired since the necessity of preparing stamps for insertion between cardboard covers is eliminated thereby saving the person servicing the machine considerable labor cost. However, this type of stamp machine has been objectionable since all known types are relatively complex in structure, expensive to manufacture, and therefore expensive to the purchaser of such a machine, and generally costly to maintain. Further, such machines have been difficult to load with stamps and difficult to clean when necessary due to the transfer of gum or adhesive from the adhesive side of the stamps to component parts of the machine during warm weather conditions.

In addition to the above, none of the stamp vending machines heretofore known have been completely electrically operated and automatic, as well as being economically and simply constructed.

It is therefore an object of this invention to obviate the above faults of the heretofore developed machines, and provide an improved stamp vending machine.

Another object of the present invention is in the provision of a stamp vending machine which is economically and simply manufactured and will operate with extremely low maintenance care, and therefore be desirable for purchase by anyone desiring a stamp vending machine.

Still another object of this invention resides in the provision of a stamp vending machine that may be loaded with a roll of stamps and will dispense a predetermined number of stamps depending upon the desires of the user.

A further object of this invention is to provide a stamp vending machine capable of receiving a roll of stamps and vending predetermined numbers therefrom, wherein the machine includes a stamp track with a reciprocating pusher and is structurally made whereby the machine may be quickly and easily loaded and the stamp track may be quickly and easily cleaned.

A still further object of this invention is to provide a stamp vending machine capable of dispensing a predetermined number of stamps from a roll of stamps, and including a pusher arranged to advance a predetermined number of stamps to a knife or cutter and a dispensing chute.

Another object of this invention is to provide a stamp vending machine that is completely automatic and will dispense a predetermined number of stamps in response to the tender of a coin.

A still further object of this invention is to provide a stamp vending machine that will dispense a predetermined number of stamps and suitable coin change upon tender of a coin.

Another object of this invention resides in the provision of a stamp vending machine capable of dispensing a predetermined number of stamps from a roll of stamps and including a reciprocating pusher arranged along a stamp track for advancing the stamps toward a cutter, wherein means is provided for simply and economically adjusting the number of stamps to be dispensed within the limits of pusher movement, wherein the added cost for such a feature is so negligible that it adds little or nothing to the cost of the machine.

A still further object of this invention is in the provision of an electrically operated automatic stamp vending machine capable of dispensing a predetermined number of stamps from a roll or web of stamps, wherein a reciprocating pusher driven by an electric motor is provided to advance the stamps along a track and a solenoid is provided to operate a cutter to sever a predetermined number of stamps from the stamp web, and a double coin switching arrangement is provided operable by a single coin tendered to the machine to respectively operate the motor driven pusher and the solenoid driven cutter.

Other objects, features, and advantages of the invention will be apparent from the following detailed disclosure, taken in conjunction with the accompanying sheets of drawings, wherein like reference numerals refer to like parts, in which.

Referring to the drawings, particularly to FIGS. 1 to 13, an embodiment of the invention is herein illustrated which may be generally defined as an electrically operated automatic stamp vending machine. While the mechanism illustrated in these figures is not shown to be disclosed in a cabinet, it will be appreciated that any type of cabinet may be provided for enclosing this mechanism, such as one of vertical rectangular shape. Since the invention does not reside in the cabinet, it has been omitted for purposes of clarity.

Parallel vertically extending supporting plates 20 and 21 serve as part of the main machine frame, and may include any desirable structure at their bottom ends for supporting the mechanism within a cabinet. Adjacent the upper ends of the supporting plates and arranged therebetween is a U-shaped channel member 22 including elongated bottom and side walls 23, 24 and 25, FIG. 4, wherein the side walls 24 and 25 abut directly against the supporting plates 20 and 21 and may be suitably secured thereto. An elongated stamp track defining plate of inverted hat-shape in cross section, generally designated by the numeral 26, is arranged along the bottom of the channel member 22 and suitably secured thereto. This plate includes a longitudinally extending bottom panel 27 having its longitudinal center substantially coincident with the longitudinal center of the channel member 22 and intimately engaging the upper surface of the channel member bottom wall 23. Parallel extending vertical portions 28, 28 project upwardly from the longitudinal edges of the bottom panel 27 and define therewith a stamp track 29, wherein the stamps are provided with a rectilinear path therealong. Projecting outwardly from the upper edges of the vertical portions 28 and normal thereto are pusher guiding and supporting strips 30, 30 along which a stamp web feeder or pusher 31 slidably reciprocates.

Figures 2, 4:
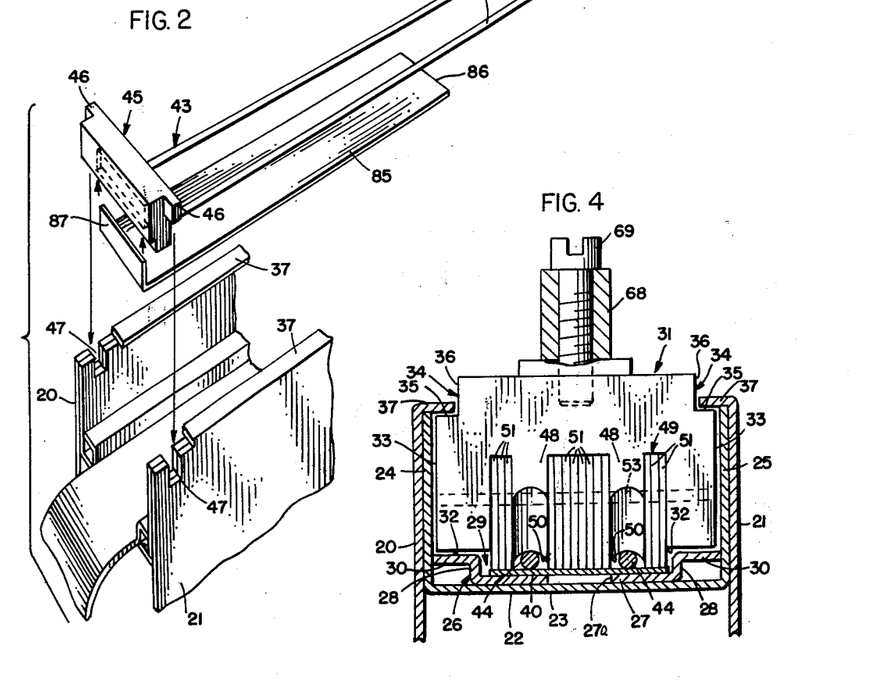
FIG. 2 is an enlarged perspective view, partially fragmentary, and exploded, illustrating the manner in which the stamp holddown means and adjustable dispensing means is mounted on the stamp track.
FIG. 4 is an enlarged transverse sectional view taken through the stamp track and illustrating the positioning of the reciprocating pusher means therein.

The stamp web feeder or pusher 31 is generally the shape of a block and provided with bottom surfaces 32 slidably engaging the pusher guiding and supporting strips 30, vertically extending surfaces 33 slightly spaced inwardly from the opposed channel member side walls 24 and 25, and upper longitudinal notches 34 defining horizontal surfaces 35 and vertical surfaces 36, as seen in FIG. 4. Inwardly projecting flanges 37 extend from the upper edges of the supporting plates 20 and 21 over the upper edges of the channel member side walls 24 and 25 and in overlying relationship to the notched horizontal surfaces 35 of the pusher 31 thereby preventing the pusher from being removed upwardly from its longitudinal track. Further, the inner longitudinal edges of the flanges 37 aid in guiding of the pusher 31 when engaging the notched vertical surfaces 36.

Figure 1:
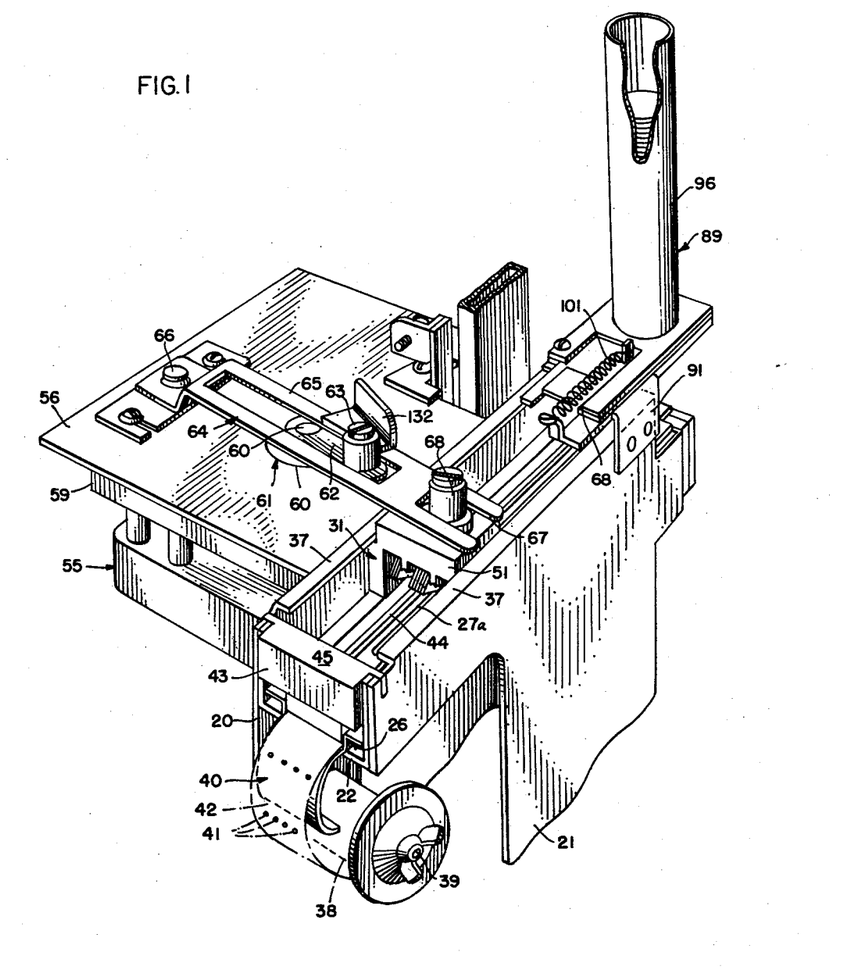
FIG. 1 is a perspective view of interior working mechanism of the stamp vending machine according to the invention.
Figure 17:
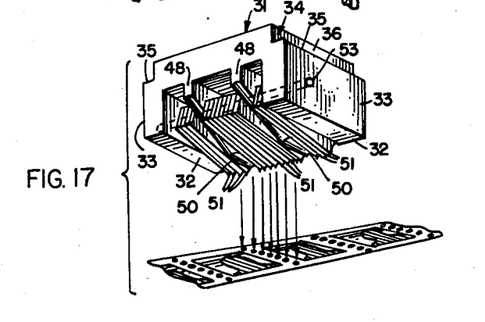
FIG. 17 is a perspective view of the pusher and illustrating how the pusher fingers engage the perforations in the stamps of the stamp web.

As seen in FIG. 1, a perforated roll of stamps 38 is rotatably mounted on a spindle 39 supported on the plate 20 from which a stamp web 40 is taken and drawn through the stamp track 29. Lines of perforations 41 separate the stamps 42. The stamp web 40 is maintained in the stamp track 29 by a stamp holddown device 43 which includes a pair of elongated holddown rods or wires 44 overlying the stamp web, FIGS. 1, 4, 6 and 7. The wires 44 are secured at one end to a positioning block 45 removably mounted at the rear end of the stamp track. This block includes oppositely extending ears 46 removably received in channel-shaped notches 47 cut in the upper rear edges of the channel side walls 24 and 25 and the supporting plates 20 and 21, FIG. 2. It may be noted also that the rear ends of the flanges 37 are cut back to provide room for the notches 47. The positioning block 45 which carries the wires 44 may easily be removed from its mounting notches 47 by lifting the block upwardly. The forward free ends of the wires 44 are generally held in proper position by a pair of guide bars 48 extending downwardly from the hollow 49 formed in the under side of the pusher 31. The lower ends of the guide bars 48 are convexly formed at 50 and slidably engage along the wires 44. Thus, when assembling the stamp holddown device in the stamp track, it is necessary to position the wires 44 in alignment with the convexly formed bottoms 50 of the guide bars 48. In order to facilitate assembly of the stamp holddown device, the rear ends of the guide bars 48 are beveled upwardly as seen in FIG. 17, whereby the holddown device may be inserted initially at a greater angle to the stamp track thereby making it easier to set the positioning block 45 in the notches 47.

Figure 5:
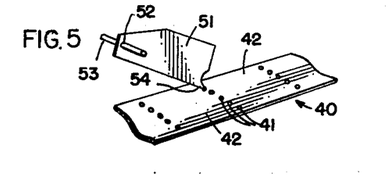
FIG. 5 is an enlarged and somewhat diagrammatic view of a single finger taken from the pusher and in engagement with a perforation in a stamp web.

The guide bars 48 are slightly spaced inwardly from the opposite vertical surfaces of the hollow 49, and between the guide bars and these surfaces and between the guide bars themselves are pivotally mounted a plurality of gravity actuated pusher fingers 51. Each finger is very thin and of light weight. An aperture 52, FIG. 5, is provided at one end of each finger to loosely and pivotally mount the finger on a transversely extending shaft 53, carried by the pusher 31. A pointed tip 54 is carried at the forward bottom edge of each finger 51 and which may easily engage in a single perforation along the line of perforations 41 in the stamp web 40. Thus, a plurality of the fingers 51 engage in the perforations in order to advance the stamp web along the stamp track 29 when the pusher 31 is advanced forwardly or away from the positioning block 45. On return of the pusher, the pointed tips 54 of the fingers 51 ride over the perforations and therefore do not move the stamp web on the return stroke. Assurance that the fingers 51 engage the lines of perforations of the stamp web is accomplished by providing a longitudinal slot 27a in the bottom of the stamp track, FIGS. 1, 4, 6 and 7, whereby the pointed tips 54 of the fingers may protrude through the perforations without engaging the stamp track.

The mechanism which reciprocates or strokes the stamp web feeder or pusher 31 along the stamp track includes a small electric motor 55 carried on a horizontally positioned mounting plate 56 secured to the supporting plate 20 and extending therefrom. The motor 55 includes a motor shaft 57 having a flywheel 58 mounted on one end. The output end of the motor shaft 57 is coupled to a reduction gear assembly 59 having a power output shaft 60 extending upwardly through an opening 61 provided in the mounting plate 56.

A crankarm 62 having a rotatably mounted roller 63 is secured to the reduction gear assembly output gear 60. The roller 63 is slidably received in a slot 64 extending longitudinally in an oscillating lever 65. One end of the lever 65 is pivotally mounted on a pin 66 extending upwardly from the mounting plate 56, while the other end thereof is bifurcated to define a slot 67 extending longitudinally of the lever and opening at the outer end thereof. The slot 67 slidably engages a roller 68 rotatably mounted on a capscrew 69 secured to the pusher 31.

Therefore, operation of the motor 55 drives the reduction gear assembly 59 and the crankarm 62 which, in turn, rotates the roller 63 through a circle thereby oscillating the lever 65. Oscillation of the lever 65 strokes or reciprocates the stamp web pusher 31 between the position shown in FIG. 6 and the position shown in FIG. 7. Depending upon the length of the stamp track 29, a certain number of stamps will be advanced toward the end of the stamp track remote from the stamp holddown positioning block 45. Thus, the length of the stamp track and the travel of the pusher 31 will determine the number of stamps advanced along the track.

Figure 6:
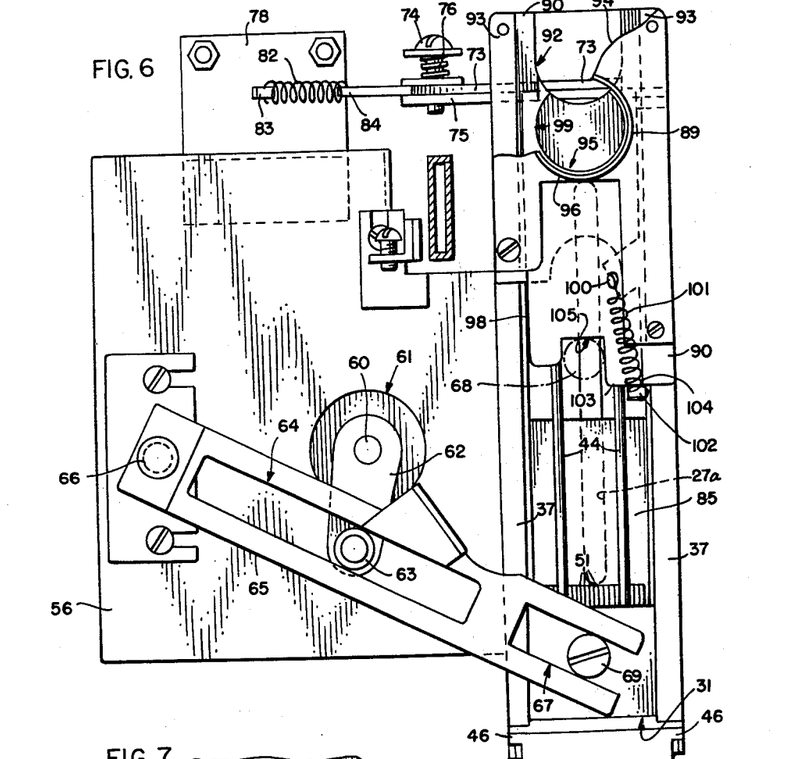
FIG. 6 is a plan view of the interior mechanism of the stamp vending machine, and illustrating another position of the parts.
Figure 7:
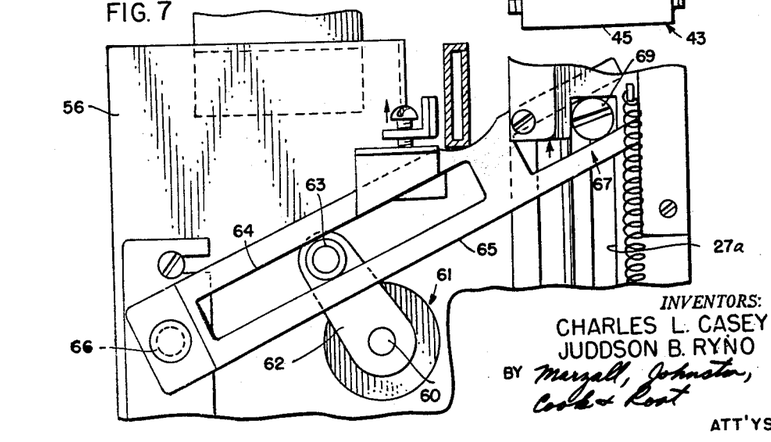
FIG. 7 is a fragmentary view in plan similar to FIG. 5 but illustrating the parts in still another position.
Figure 8:
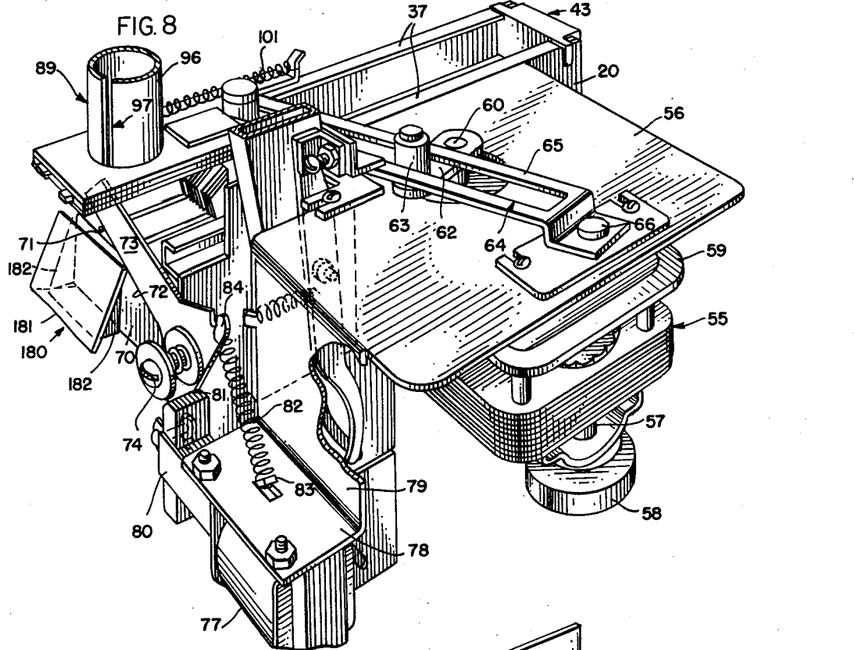
FIG. 8 is a perspective view similar to that of FIG. 1 but taken from the other side.
Figure 9:
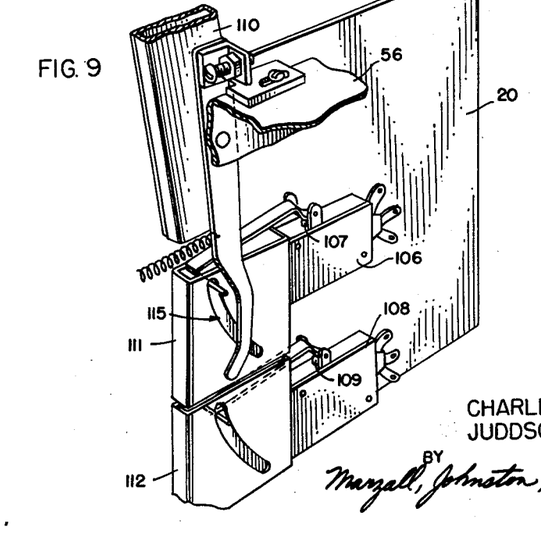
FIG. 9 is a perspective view of the detail of the invention illustrating the double coin switching arrangement.

At the very forward end of the stamp track, means is provided for cutting the stamp web along a line of perforations which includes a stationary knife blade 70 having a cutting edge 71, FIGS. 6 and 8, which meshes with a cutting edge 72 of a movable knife blade 73. The movable knife blade 73 is pivotally mounted on a capscrew 74 secured to an extension 75 of the stationary knife blade 73, FIG. 6. A spring 76 is received on the capscrew 74 and resiliently biases the movable knife blade 73 against the extension 75 and the stationary knife blade 73 to assure good cutting action at all times.

The movable knife blade 73 is actuated to cut the stamp web by an electric solenoid 77 mounted on a flange 78 spaced downwardly from the mounting plate 56 and integrally connected thereto by means of a substantially vertically extending leg 79, FIG. 8. The solenoid 77 is provided with an armature plunger 80 pivotally connected to an arm 81 extending from the movable knife blade 73. The plunger 80 is normally biased to its protracted position and the movable knife blade is normally biased to its up position as seen in FIG. 8 by a spring 82 connected at one end to a lug 83 on the solenoid mounting flange 79 and at the other end to a lug 84 on the movable knife blade 73. Energization of the solenoid 77 retracts the plunger 80 and pivots the movable knife blade 73 about its capscrew 74 against the biasing of the spring 82, whereby the cutting edge 72 of the movable knife blade 73 meshes with the cutting edge 71 of the stationary knife blade 70 to sever the stamp web. Thus, the number of stamps delivered beyond the knife blades 70 and 73 determines the number of stamps to be dispensed from the machine.

Since the stamps are dispensed from a roll and may inherently have some curvature even after being conveyed along the rectilinear path defined by the stamp track, a stamp guide 180 is provided at the discharge end of the stamp track to prevent buckling and catching of the discharge stamps which would prevent same from dropping into the discharge chute. This stamp guide includes a plate 181 having parallel spaced ledges 182 between which the stamps are guided.

Figure 3:
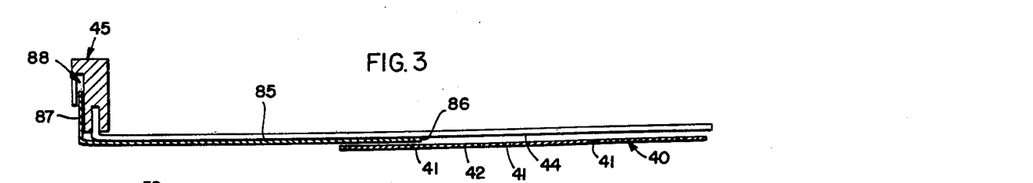
FIG. 3 is a longitudinal sectional view taken through the stamp holddown and adjustable dispensing means in assembled relationship.

The number of stamps advanced by the pusher 31 can be regulated within limits by positioning a thin adjusting strip 85 between the holddown wires 44 and the upper surface of the stamp web 40, FIGS. 2, 3 and 6. The adjusting strip 85 terminates at its forward end to define a leading edge 86 extending transverse to the path of stamp web travel. An upwardly extending lip 87 is provided at the rear end of the adjusting strip 85 and which is freely received in a socket 88 provided in the stamp holddown positioning block 45, FIG. 3, when the holddown device and adjusting strip are in assembled relationship. Hence, the adjusting strip is prevented from moving along the stamp track by virtue of the lip 87 engaging in the socket 88. Effectively, the adjusting strip 85 covers a certain portion of the stamp web 40 in the stamp track, whereby engagement of the pusher fingers 51 with the stamp web lines of perforations 41 is prevented when the pusher 31 and fingers 51 move over the adjusting strip 85. During the forward stroke of travel of the pusher 31, the fingers 51 drop onto the stamp web upon leaving the adjusting strip leading edge 61, and thereby engage a line of perforations 41 in the stamp web to advance the stamp web a distance substantially equal to the distance between the adjusting strip leading edge 86 and the extreme forward point of travel of the pusher fingers 51, or a distance equal to the number of stamps between the first line of perforations engaged by the pusher fingers and the forward end of the stamp track. Accordingly, the number of stamps dispensed may be determined by the length of the adjusting strip 85 extending ahead of the extreme rearward travel of the pusher fingers 51. Therefore, a single machine may be provided for dispensing various numbers of stamps by merely changing the adjusting strip 85.

Inasmuch as it may be desirable to also dispense change, such as one or more pennies with the stamps dispensed, a change return mechanism 89 is provided to dispense a coin or coins into the stamp dispensing chute provided in the cabinet of the machine. This coin return mechanism includes a bottom plate 90, FIG. 6, mounted on the machine by means of a flange 91, FIG. 1, being secured to the side plate 21. A dispensing opening 92 is provided at the forward end of the bottom plate 90, FIG. 6. A pair of parallel spaced spacer and guide bars 93 are mounted on the upper surface of the bottom plate 90, and overlying these bars is an upper plate 94. A coin aperture 95 is provided in the upper plate 94 and positioned over the bottom plate 90 adjacent to its dispensing opening 92. A coin storage tube 96 extends upwardly from the upper plate 94 and has its lower end in alignment with the aperture 95. A vertically extending slot 97, FIG. 8, is provided in the tube 96 for purposes of viewing the supply of coins therein and permitting manipulation of the coins should they not stack properly.

A supply of coins placed in the tube will necessitate the lowermost coin as being supported directly on the bottom plate 90 but below the upper plate 94. A slidable coin ejector 98 is reciprocably received between the bottom and upper plates, and provided with a cutout 99 for receiving the lowermost coin and ejecting it forwardly to the dispensing opening in the bottom plate whereby the coin will drop by gravitation. An upwardly extending lug 100, FIG. 6, is provided on the slidable coin ejector 98 for connection with one end of the spring 101 thereto, the other end being connected to a lug 102 extending upwardly from the bottom plate 90. A rearwardly projecting edge 103 of the slidable coin ejector 98 engages a stop 104 in its rearward position and is maintained in that position by means of the spring 101. The slidable coin ejector 98 is engaged and actuated by forward movement of the stamp web pusher 31, wherein the roller 68 engages a notched portion 105. Thus, coins are maintained in the storage tube 96, and every forward stroke of the pusher 31 will eject a coin and return change to the operator. The coin return mechanism may be constructed to return one or more coins depending upon the desires of the user.

Operation of the pusher driving motor 55 and the solenoid operated knife blade 73 is accomplished by a switching arrangement responsive to the coin tended to the machine. This switching arrangement includes a normally open motor switch 106 having an operating plunger 107 and a normally open solenoid switch 108 having an operating plunger 109. See particularly FIGS. 9 to 13. A coin tended to the machine will be directed to the coin chute 110 and be allowed to drop by gravity to a motor switch box 111 and then to a solenoid switch box 112. The switches 106 and 108 and the switch boxes 111 and 112 are secured to the supporting plate 20 below the mounting plate 56.

The motor switch box 111 is provided with a coin receiving channel or chute 113 having its upper end in alignment with the lower end of the coin chute 110, and feeds to the upper end of the coin channel or chute 114 provided in the solenoid coin box 112. After a coin passes through both coin channels, it may drop into a coin collecting receptacle (not shown).

Figure 10:
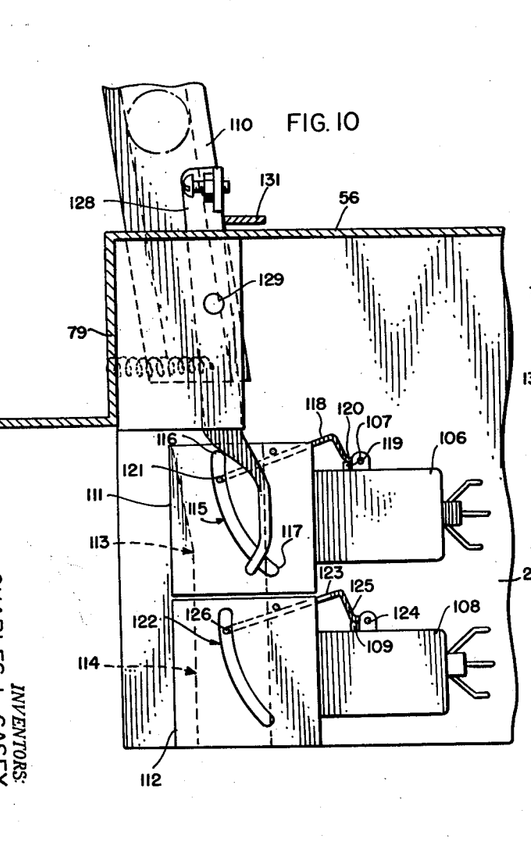
FIGS. 10, 11, 12 and 13 are side elevational views of the double coin switching arrangement, showing the parts in various positions relative to their operation and steps of operation of the various component parts of the machine.

The coin channel 113 and motor switch box 111 are defined by front and back walls which are provided with aligned arcuate slots 115 having their upper ends 116 arranged substantially coincident with the center of the coin channel and their lower ends 117 terminating at one side of the channel or slightly outside of the channel. The switch 106 includes a switch arm 118 pivoted to the body of the switch 119 and having a plunger actuating portion in engagement with the plunger 107. The plunger 107 is normally biased to its up position and accordingly biases the switch arm 118 to its up normal position as shown in FIG. 10. At the outer free end of the switch arm 118, a coin engaging pin 121 extends substantially perpendicular to the arm and through the slots 115 in the switch box 111. Accordingly, the coin engaging pin 121 is arranged in the coin path of the coin channel 113.

Similarly, slots 122 are provided in the front and back walls of the switch box 112 and arranged to traverse the coin path. The solenoid switch 108 includes a switch arm 123 pivoted at 124 and having a plunger actuating portion 125 for engaging the plunger 109. Extending perpendicularly from the outer free end of the switch arm 123 is a coin engaging pin 126 arranged to traverse the coin path in the coin channel 114 and operate along the slots 122.

A coin dropping from the chute 110 to the coin channel 113 of the motor switch box 111 strikes the pin 121 thereby forcing the switch arm 118 downwardly and the plunger 107 downwardly to close the switch 106 for energizing the drive motor 55. Similarly, when the coin leaves the motor switch box 111, it drops into the coin channel 114 of the solenoid switch box 112 and engages the pin 126 forcing the switch arm 123 and plunger 109 downwardly to close the switch 108 and energize the solenoid 77 thereby operating the knife blade 73. When the coin leaves the switch box 111, it permits the switch arm 118 to return to its normal position thereby opening the switch 106 on stopping the motor 55. Similarly, when the coin leaves the switch box 112 it permits return of the switch arm 123 to its normal position and deenergization of the solenoid 77.

Figure 11:
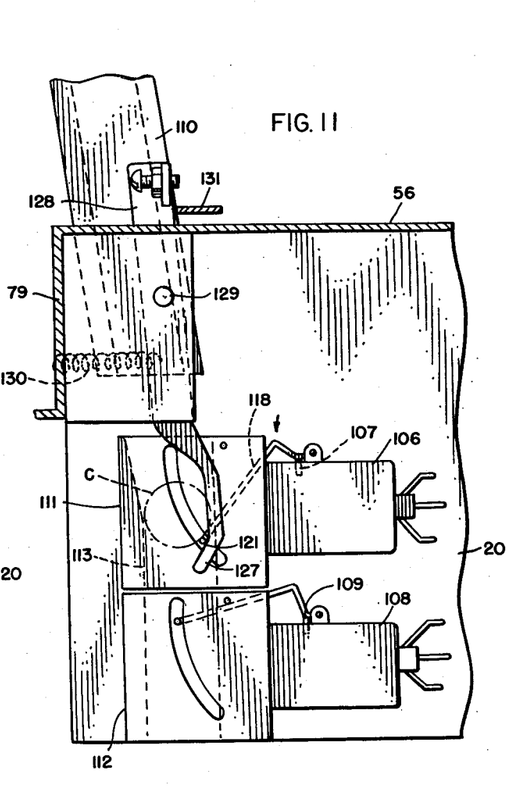
Figure 12:
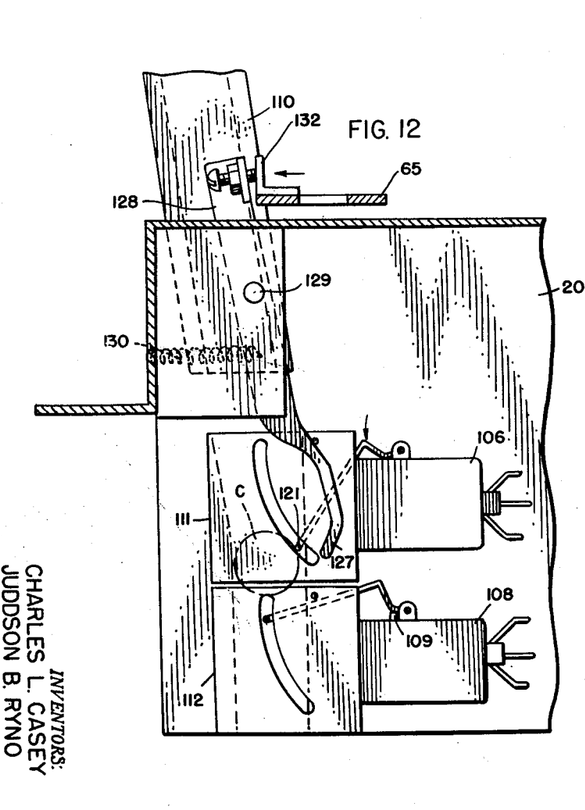
Figure 13:
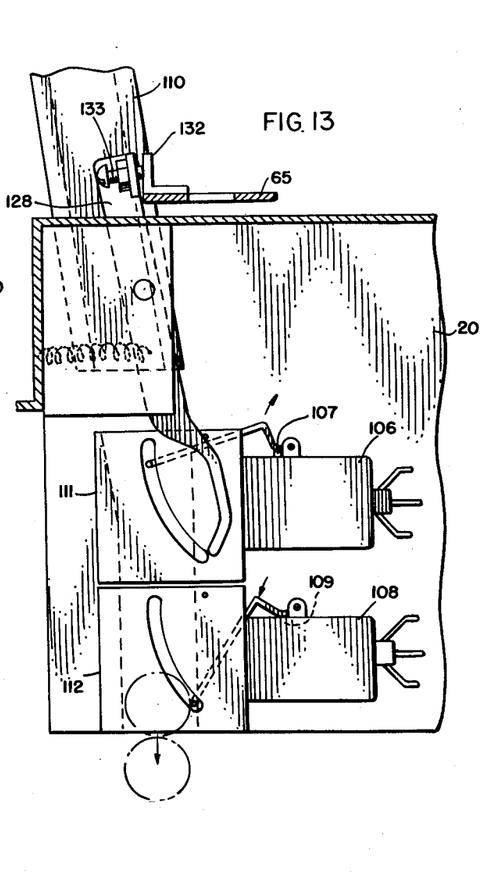

Referring particularly to FIG. 11, a coin C initially drives the pin 121 downwardly along the path of the arcuate slots 115 until the pin engages a stop 127 carried on the free end of a lever 128 pivoted at 129. The pin 121 held in the position shown in FIG. 11 by the stop 127 sufficiently blocks the coin channel 113 to prevent the coin C from passing therethrough. At the same time, the pin 121 drives the switch arm 118 downwardly a sufficient distance to close the switch 106 and energize the motor 55. The normal position of the pusher and its driving parts is illustrated in FIG. 1, and the motor will operate the crankarm 62 to drive the lever 65 and stamp pusher 31 toward the stamp holddown positioning block 45 or the rear end of the stamp track. As the crankarm 62 continues to rotate it will force the lever 65 to reverse its direction of movement and drive the pusher 31 forwardly away from the stamp holddown positioning block 45 to advance the stamp web in the stamp track.

A spring 130 connected at one end to the stationary frame leg 79 and at the other end to the lever 128 below the pivot 129 normally biases the lever 128 to the position shown in FIGS. 10 and 11, wherein the portion of the lever above the pivot 129 engages a stop 131. Thus, the lever 128 is normally biased against the stop 131.

When the pusher 31 has reached its forward position after operating the coin return mechanism 89, the lever 65 operates to deenergize the motor, wherein a lug 132 carried thereon engages the end of a setscrew 133 adjustably carried on the upper end of the lever 128. The lug 132 and lever 65 drive the lever 128 about its pivot 129 against the biasing of the spring 130 and thereby remove the stop 127 from the path of the pin 121 to permit the coin C to further drive the pin downwardly and out of its path so that the coin may pass through the discharge end of the coin channel 113 and allow return of the switch arm 118 to normal and opening of the switch 106. Because of the flywheel 58 on the motor shaft 57, the momentum of the motor will carry the lever 65 to the normal position shown in FIG. 1 and thereby remove the lug 132 from the path of the setscrew 133 to permit the lever 128 to return to its normal position as shown in FIGS. 10 and 11 for subsequent operation of the machine by another coin. After the coin C drops from the switch box 111, it will then pass through the coin switch box 112 and close the switch 108 to energize the solenoid 77 and operate the movable knife blade 73 for severing that length of stamp web advanced through the stamp track.

Figure 18:
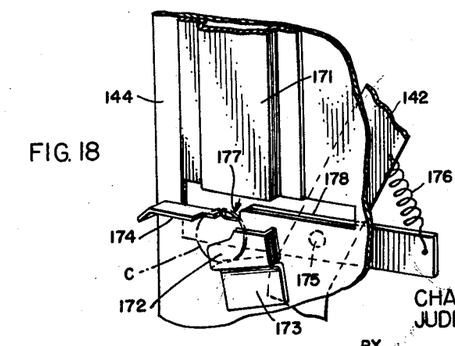
FIG. 18 is a fragmentary perspective view of the coin operated mechanism of the stamp vending machine shown in FIGS. 14 and 15.
Figures 19, 20:
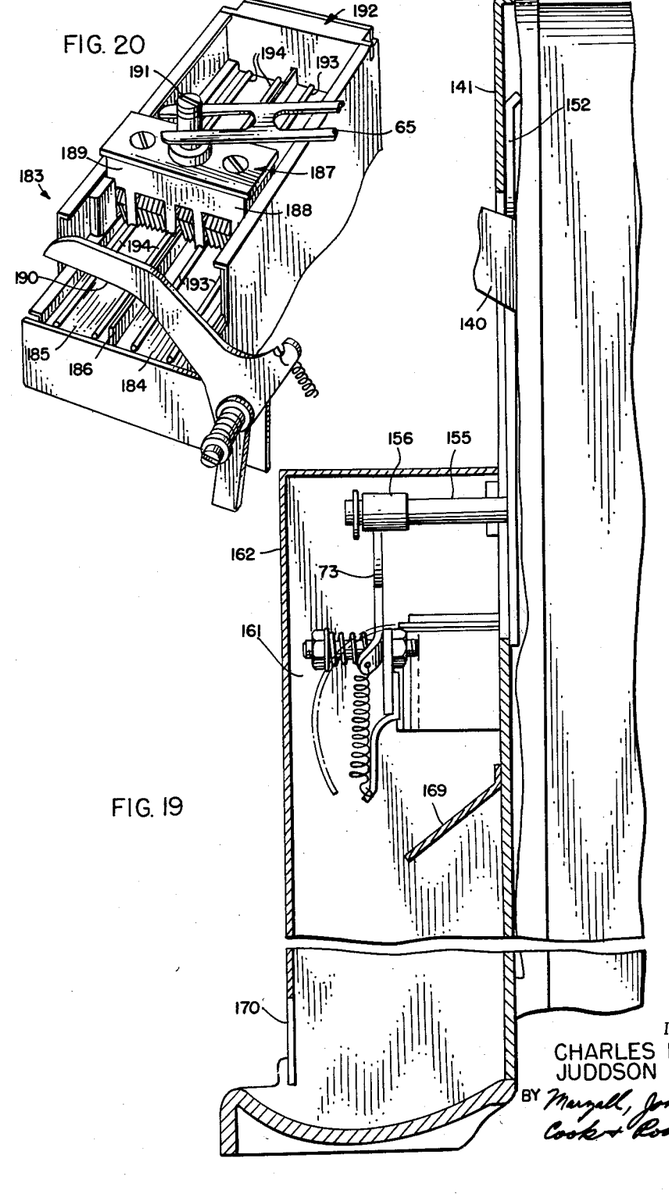
FIG. 19 is a somewhat transverse sectional and elevational view taken through the cabinet of the machine shown in the embodiment of FIGS. 14 and 15 and illustrating the positioning of certain component parts.
FIG. 20 is a perspective view of a modification of the invention wherein a double track and pusher arrangement is utilized.

Referring now to FIGS. 14 to 19, a modification of the invention is illustrated which differs primarily from the embodiment of FIGS. 1 to 13 in that it is manually operated, wherein the operator after tendering a coin to the machine depresses the handle 140 arranged outside of the cabinet 141, FIG. 19. This depressing action operates the stamp pusher and knife blade as will be hereinafter more particularly described. It will be noted that the stamp track and pusher mechanism itself are substantially identical with that in the embodiment of FIGS. 1 to 13, and therefore will have equivalent parts designated by similar numerals. Specifically, the manner in which the stamp track may be cleaned, and the manner in which the stamp web is loaded is substantially like that in the first embodiment. Thus, the main difference between the embodiments is that one shown in FIGS. 14 to 19 is manually operated, and accordingly may be more economically manufactured for a specific market.

The handle 140 is integrally connected with a bellcrank 142 positioned within the cabinet and pivotally mounted at 143 to a vertically extending support plate 144. A laterally extending pin 145 is carried by the bellcrank 142 below the pivot 143. This pin slidably engages in a track 146 mounted on a lever 147, FIG. 15. The lever 147 is pivotally mounted at its lower end at 148 to the supporting plate 145, and is provided with a longitudinally extending slot 149 at the upper end which slidably receives a shaft mounted roller 150 carried by a plate 151 secured to the top surface of the stamp pusher 31. Thus, the pressing of the handle 140 pivots the bellcrank 142 about its pivot 143 and drives the lever 147 rearwardly as seen in FIG. 15 to retract the stamp pusher 151.

Depressing of the handle 140 also operates the movable knife blade 73 to sever the stamp web. In this respect, a vertically arranged bar 152 is mounted on a bracket 153, the latter of which is pivotally mounted to the bellcrank 142 at 154. The bar 152 rides on the inner surface of the front cabinet wall, FIG. 19, and is therefore maintained generally in a vertical position during depressing of the handle 140. At the lower end of the bar 152, a forwardly extending rod 155 is mounted and pivotally carries on its outer end a roller 156, FIG. 15. The roller 156 is in camming engagement with a cam surface 157 formed on the back side of the movable knife blade 73, whereby downward movement of the roller 156 acts to pivot the knife blade 73 by camming action about its pivot 74 to sever the stamp web. A spring 158 resiliently returns the knife blade 73 to its normal position when the roller 156 has returned to its upper position.

Figure 14:
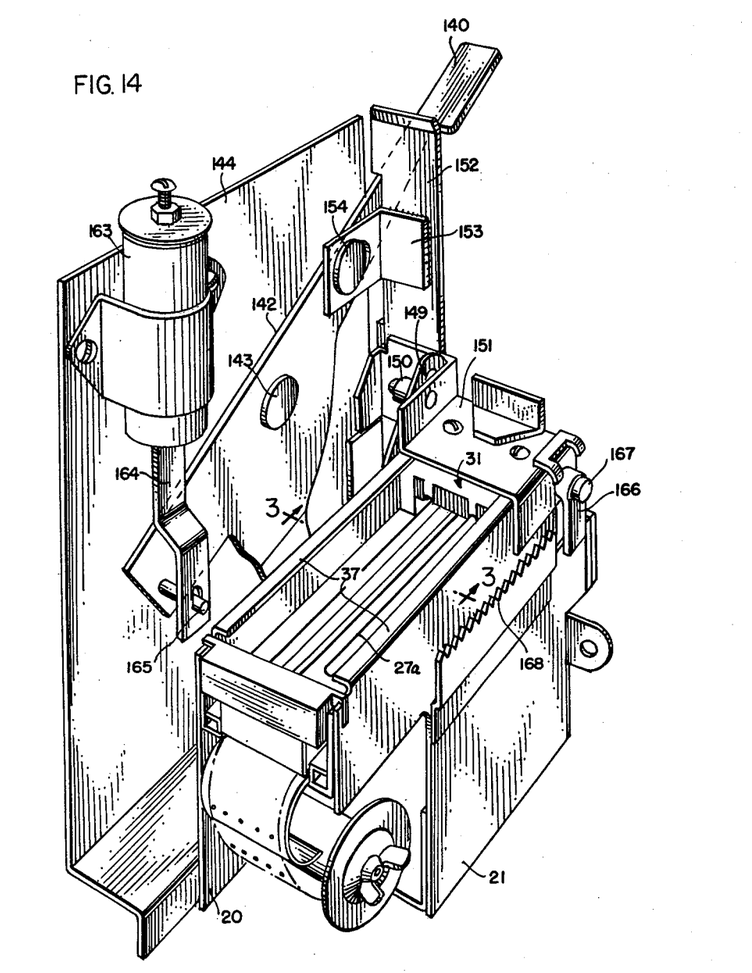
FIG. 14 is a perspective view of a modification of the invention, wherein the machine is constructed for manual operation.
Figure 15:
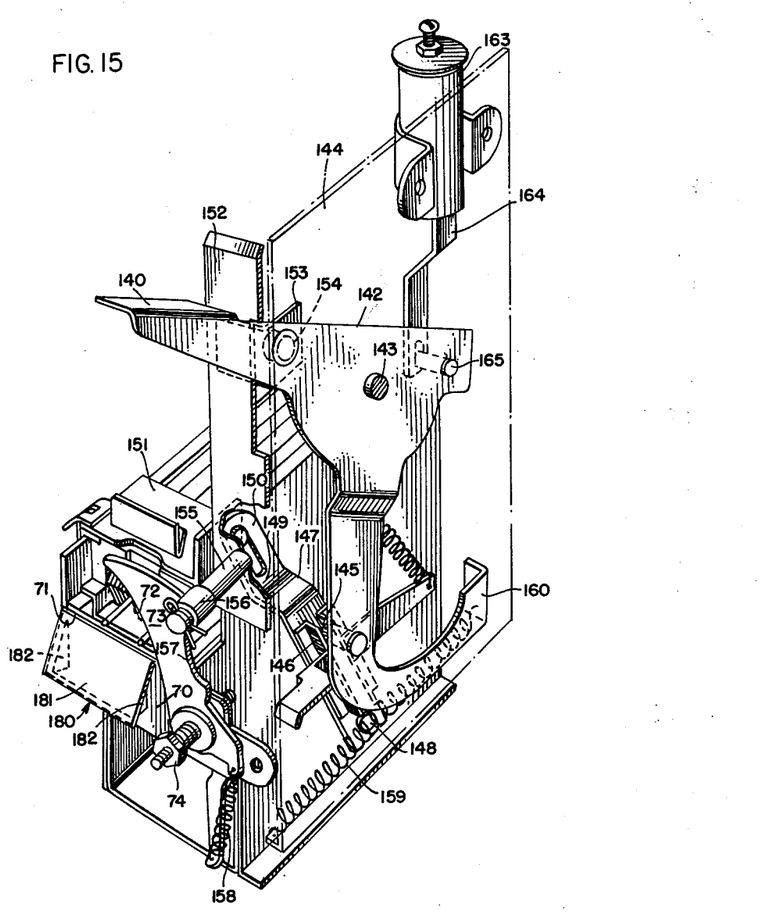
FIG. 15 is a perspective view of the machine of FIG. 14 taken from the other side.
Figure 16:
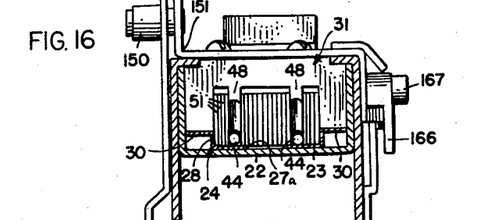
FIG. 16 is a transverse sectional view, taken through the stamp track of the machine of FIGS. 14 and 15.

Upon release of pressure on the handle 140, a spring 159, FIG. 15, connected at one end to a portion 160 of the bellcrank 142 and the other end to the stationary supporting plate 144 acts to return the handle to its upper position and also bring the stamp pusher forwardly to its forward position as shown in FIGS. 14 and 15. During this return stroke, the stamp web is then fed out over the end of the stamp track and into a compartment 161 defined by the forward portion 162 of the cabinet, FIG. 19. This advanced portion of the stamp web is then severed during the next stroke of operation by the movable knife blade 73.

In order to reduce the shock of the parts during operation of the handle 140, a fluid operated dash pot 163 is secured to the mounting plate 144, and has its plunger connected to the bellcrank 142 by means of a link 164 coupled to a pin 165 extending from the bellcrank, FIG. 14.

In order to prevent an operator from losing his coin without receiving stamps should he accidentally release the handle 140 before it has been pushed to its extreme downward position, a pawl 166, FIG. 14, is pivoted at 167 to the pusher plate 151, and engages a straight ratchet bar 168 during stroking of the stamp pusher 131. Once the pawl 166 engages the first tooth on the ratchet bar, the stamp pusher 131 and handle 140 cannot return to its normal upper position until it has completed its stroke and allowed the pawl 166 to pass beyond the rear end of the ratchet bar 168. At that time, the pawl releases from the ratchet bar and permits return of the handle and stamp web pusher.

Referring to FIG. 19, a deflector 169 is mounted within the compartment 161 and generally prevents anyone from extending his fingers through the stamp discharge opening 170 and reaching the outer free end of the stamp web. Thus, the deflector 169 guards against tampering with the machine.

A coin tendered to the machine drops through the coin chute 171, FIG. 18, and into a pocket member 172. The pocket member 172 is provided with an upwardly sloping coin engaging surface 173 which bears against the bottom side of the coin C. The upper side of the coin C engages a camming lug 174 which is pivotally mounted at 175 to the bellcrank 142. A spring 176 maintains the lug 174 in a position which will normally engage a shoulder 177 on the mounting plate 144 and prevent the bellcrank 142 from pivoting about its pivot unless a coin is received in the pocket member 172. With the coin C in position, it serves to cam upwardly the camming lug 174 so that it will clear the shoulder 177 and permit the lug to move rearwardly along a supporting surface 178 defined by a slot provided in the mounting plate 144.

Referring to FIG. 20, a modification is illustrated differing in that a double pusher and track arrangement may be provided for certain installations, such as discharging stamps of different denominations, where it may be desired to give stamps of value equal to the coin tendered. Specifically, for a dime, one pusher and track may be adjusted to dispense two four cent stamps, while the other pusher and track may be adjusted to dispense two one cent stamps or one two cent stamp. Actually, any number of tracks may be provided to give any combination of stamps dispensed that may be desired. In FIG. 20 a double track 183 having a pair of stamp tracks 184 and 185 separated by an upstanding intermediate partition 186, slidably receives a double pusher 187 having pusher portions 188 and 189 received by tracks 184 and 185, respectively. A knife blade 190 is similar to the knife blade 73 of the other embodiments, except that it is longer and severs stamps from both stamp webs substantially simultaneously. A roller 191 is provided on the pusher 187 which serves the same purpose as the roller 68 in the other embodiments and will be engaged by the drive mechanism already set forth. A single holddown device 192 is provided to hold both stamp webs in place in the tracks 184 and 185. The holddown device includes two sets of holddown wires 193 and 194 receivable respectively in tracks 184 and 185. It will be understood that any number of tracks may be provided, each of which would have a pusher and set of holddown wires.

It will be understood that modifications and variations may be effected without departing from the scope of the novel concepts of the present invention, but it is understood that this application is to be limited only by the scope of the appended claims.

The invention is hereby claimed as follows:

1. In a stamp vending machine having an elongated upwardly opening channel member, a recessed portion extending longitudinally along the bottom of the channel member defining a stamp track adapted to receive a stamp web, means for mounting a roll of stamps adjacent the inlet end of said stamp track, reciprocating means for engaging and feeding the stamp web along said stamp track, and knife blade means for severing the stamp web at the discharge end of the track, the improvement in stamp web holddown means maintaining said stamp web in said track, said holddown means including a wire rod extending parallel to the longitudinal axis of said stamp track in superposed engaging relation to the stamp web and substantially along the entire length of the track, a pair of aligned transversely extending upwardly opening slots on opposite sides of said channel member at the inlet end of said track, and a positioning member having the rod secured thereto, said positioning member having ears extending from opposite ends thereof and freely received in said slots, whereby the rod is easily removable to provide access to said track by lifting said positioning member upwardly.

2. In a stamp vending machine having an elongated upwardly opening channel member, a recessed portion extending longitudinally along the bottom of the channel member defining a stamp track adapted to receive a stamp web, means for mounting a roll of stamps adjacent the inlet end of said stamp track, reciprocating means for engaging and feeding the stamp web along said stamp track, and knife blade means for severing the stamp web at the discharge end of the track, the improvement in stamp web holddown means maintaining said stamp web in said track, said holddown means including a pair of parallel extending wire rods in superposed engaging relation to the stamp web and extending substantially along the entire length of the track, a pair of aligned transversely extending upwardly opening slots on opposite sides of said channel member at the inlet end of said track, and a positioning member having the rods secured thereto, said positioning member having ears extending from opposite ends thereof and freely received in said slots, whereby the rods are easily removable to provide access to said track by lifting said positioning member upwardly.

3. The combination as defined by claim 1, and means for regulating the advancing movement of said stamp web to control the number of stamps discharged from said track.

4. In a stamp vending machine having an elongated upwardly opening channel member, a recessed portion extending longitudinally along the bottom of the channel member defining a stamp track adapted to receive a stamp web, means for mounting a roll of stamps adjacent the inlet end of said stamp track, reciprocating means for engaging and feeding the stamp web along said stamp track, and knife blade means for serving the stamp web at the discharge end of the track, the improvement in stamp web holddown means maintaining said stamp web in said track, said holddown means including a pair of parallel extending wire rods in superposed engaging relation to the stamp web and extending substantially along the entire length of the track, a pair of aligned transversely extending upwardly opening slots on opposite sides of said channel member at the inlet end of said track, a positioning member having the rods secured thereto, said positioning member having ears extending from opposite ends thereof and freely received in said slots, whereby the rods are easily removable to provide access to said track by lifting said positioning member upwardly, and means for regulating the number of stamps discharged from the track, said means comprising a relatively thin plate arranged between the stamp web and said wire rods, said strip having an upwardly extending flange at one end freely received in a slot formed in said positioning member.

5. In a stamp vending machine having an elongated upwardly opening channel member, a recessed portion extending longitudinally along the bottom of the channel member defining a stamp track adapted to receive a stamp web, means for mounting a roll of stamps adjacent the inlet end of said stamp track, reciprocating means for engaging and feeding the stamp web along said stamp track, and knife blade means for severing the stamp web at the discharge end of the track, the improvement in stamp web holddown means maintaining said stamp web in said track, said holddown means including a pair of wire rods extending parallel to each other and the longitudinal axis of said stamp track in superposed engaging relation to the stamp web and extending substantially along the entire length of the track, a pair of aligned transversely extending upwardly opening slots on opposite sides of said channel member at the inlet end of said track, and a positioning member having one end of the rods secured thereto, said positioning member having ears extending from opposite ends thereof and freely received in said slots, whereby the rods are easily removable to provide access to said track by lifting said positioning member upwardly.

References Cited in the file of this patent

UNITED STATES PATENTS

| | | |
|---|---|---|
| 901,126 | Schaefer | Oct. 13, 1908 |
| 1,060,291 | Small | Apr. 29, 1913 |
| 1,410,955 | Pruitt | Mar. 28, 1922 |
| 1,587,902 | Crawford | June 8, 1926 |
| 1,757,801 | Higgins | May 6, 1930 |
| 1,820,306 | Ferguson | Aug. 25, 1931 |
| 2,021,038 | West | Nov. 12, 1935 |
| 2,121,864 | Flood | June 28, 1938 |
| 2,186,010 | Curtis | Jan. 9, 1940 |
| 2,238,113 | Haynsworth | Apr. 15, 1941 |
| 2,669,335 | May | Feb. 16, 1954 |
| 2,694,974 | Briggs | Nov. 23, 1954 |
| 2,699,100 | Simjian | Jan. 11, 1955 |
| 2,720,994 | Arvidson | Oct. 18, 1955 |
| 2,748,861 | Von Stoeser | June 5, 1956 |
| 2,865,699 | Fitzgerald | Dec. 23, 1958 |

FOREIGN PATENTS

| | | |
|---|---|---|
| 410,259 | France | May 17, 1910 |